US012669337B2

(12) United States Patent
Kim

(10) Patent No.: US 12,669,337 B2
(45) Date of Patent: Jun. 30, 2026

(54) METHOD AND APPARATUS FOR GENERATING A DRIVING ROUTE BASED ON ORIGIN-DESTINATION RELATIONSHIP

(71) Applicant: 42DOT INC., Seoul (KR)

(72) Inventor: Ji Seong Kim, Yongin (KR)

(73) Assignee: 42DOT INC., Seoul (KR)

( * ) Notice: Subject to any disclaimer, the term of this patent is extended or adjusted under 35 U.S.C. 154(b) by 327 days.

(21) Appl. No.: 17/815,641

(22) Filed: Jul. 28, 2022

(65) Prior Publication Data

US 2022/0364869 A1 Nov. 17, 2022

Related U.S. Application Data

(63) Continuation of application No. PCT/KR2021/020336, filed on Dec. 31, 2021.

(30) Foreign Application Priority Data

Dec. 31, 2020 (KR) ........................ 10-2020-0189734
Dec. 30, 2021 (KR) ........................ 10-2021-0193056

(51) Int. Cl.
  *G01C 21/34* (2006.01)
  *G01C 21/36* (2006.01)
  *G06Q 50/40* (2024.01)
(52) U.S. Cl.
  CPC ....... *G01C 21/343* (2013.01); *G01C 21/3605* (2013.01); *G06Q 50/40* (2024.01)
(58) Field of Classification Search
  CPC ... G01C 21/343; G01C 21/3605; G06Q 50/40
  See application file for complete search history.

(56) References Cited

U.S. PATENT DOCUMENTS 5,036,471 A 7/1991 Tamura
6,778,904 B2 * 8/2004 Iwami ................ G01C 21/3644
340/995.27

(Continued)

FOREIGN PATENT DOCUMENTS

JP 07-294267 A 11/1995
JP 2004-245630 A 9/2004

(Continued)

OTHER PUBLICATIONS

Psaraftis, Harilaos N. "A dynamic programming solution to the single vehicle many-to-many immediate request dial-a-ride problem." Transportation Science 14.2 (1980): 130-154. (Year: 1980).*

(Continued)

*Primary Examiner* — Faris S Almatrahi
*Assistant Examiner* — Selena M Jin
(74) *Attorney, Agent, or Firm* — Harvest IP Law, LLP

(57) ABSTRACT

A method and system for generating an efficient driving route for a transportation vehicle providing a personal mobility service is disclosed. A transportation vehicle may be a car, truck, bicycle, motorcycle, or the like that transport a payload. A payload may be a person or a product being transported by the vehicle. The personal mobility service broadly refers a service that enables users to plan and book a transportation service at a convenient location and time. A plurality of transportation requests each comprising an origin and a destination is received from the users, a driving route creation device generates an efficient route that visits all destinations of the plurality of transportation requests, and the route may be presented to the users.

16 Claims, 8 Drawing Sheets

(56)                References Cited

U.S. PATENT DOCUMENTS

| | | | | |
|---|---|---|---|---|
| 8,775,059 | B2* | 7/2014 | Heed | G06Q 10/047 |
| | | | | 701/117 |
| 9,131,376 | B2* | 9/2015 | Bondesen | H04L 63/0884 |
| 9,389,089 | B2* | 7/2016 | Wingrove | G01C 21/34 |
| 10,161,757 | B2* | 12/2018 | Nesbitt | G01C 21/3461 |
| 11,085,788 | B2* | 8/2021 | Saraogee | G01C 21/3626 |
| 2004/0215388 | A1* | 10/2004 | Takenaka | G01C 21/343 |
| | | | | 340/995.14 |
| 2016/0286360 | A1* | 9/2016 | Miller | G01C 21/3682 |
| 2016/0307287 | A1* | 10/2016 | Jat | G01C 21/3453 |
| 2017/0046653 | A1* | 2/2017 | Wilson | G06Q 10/0838 |
| 2017/0219369 | A1* | 8/2017 | Lei | G08G 1/096758 |
| 2018/0060988 | A1* | 3/2018 | Klenk | G08G 1/202 |
| 2018/0328747 | A1* | 11/2018 | Farmer | G06Q 50/40 |
| 2019/0156218 | A1* | 5/2019 | Lehoux | G06Q 10/047 |
| 2019/0205813 | A1* | 7/2019 | Sharma | G06F 16/951 |
| 2019/0311453 | A1* | 10/2019 | Schneider | G06Q 10/06315 |
| 2019/0360828 | A1* | 11/2019 | Zhang | G06F 18/24 |
| 2020/0173789 | A1* | 6/2020 | Kelleher | G06Q 10/047 |
| 2020/0286039 | A1* | 9/2020 | Fan | G06Q 10/087 |
| 2021/0216929 | A1* | 7/2021 | Lassoued | G01C 21/3469 |
| 2022/0364869 | A1* | 11/2022 | Kim | G06Q 50/40 |
| 2024/0412646 | A1* | 12/2024 | Vos | G01C 23/00 |

FOREIGN PATENT DOCUMENTS

| | | | | |
|---|---|---|---|---|
| JP | 2005316983 | A | | 11/2005 |
| JP | 2009128092 | A | * | 6/2009 |
| JP | 2009204417 | A | * | 9/2009 |
| JP | 2010249836 | A | * | 11/2010 |
| JP | 2011145164 | A | * | 7/2011 |
| JP | 2013083588 | A | | 5/2013 |
| JP | 2017-191504 | A | | 10/2017 |
| KR | 10-2004-0038883 | A | | 8/2004 |
| KR | 10-2015-0036172 | A | | 4/2015 |
| KR | 101633040 | B1 | | 6/2016 |
| KR | 10-1740029 | B1 | | 6/2017 |
| KR | 10-1783702 | B1 | | 10/2017 |
| KR | 10-1896993 | B1 | | 9/2018 |
| KR | 10-2280965 | B1 | | 7/2021 |
| WO | 2020262673 | A1 | | 12/2020 |

OTHER PUBLICATIONS

R. R. Pandi, S. G. Ho, S. C. Nagavarapu and J. Dauwels, "Deterministic Annealing for Depot optimization: Applications to the Dial-A-Ride Problem," 2018 IEEE Symposium Series on Computational Intelligence (SSCI), Bangalore, India, 2018, pp. 88-95, doi: 10.1109/SSCI.2018.8628642. (Year: 2018).*

Translation of JP 2009128092 A (Year: 2009).*
Translation of JP 2009204417 A (Year: 2009).*
Translation of JP 2010249836 A (Year: 2010).*
Translation of JP 2011145164 A (Year: 2011).*
Office Action from Japanese Patent Office for a corresponding Japanese Patent Application. May 23, 2024.
Office Action from Japanese Patent Office for a corresponding Japanese Patent Application. Apr. 22, 2024.

* cited by examiner (a)

(b)

(c)

(d)

(e)

begin acquiring location data of first group nodes and
second group nodes — 910 selecting a next node to visit from at least one unselected
node in first group or at least one destination node
paired with least one selected node, based on at
least one location of the at least one selected node — 920 gnenrating a drive route in order of node selecting — 930 end

METHOD AND APPARATUS FOR GENERATING A DRIVING ROUTE BASED ON ORIGIN-DESTINATION RELATIONSHIP

CROSS-REFERENCE TO RELATED APPLICATION

This application is a Continuation application of International Application No. PCT/KR2021/020336 filed Dec. 31, 2021, which claims priority from Korean Patent Application 10-2020-0189734, filed Dec. 31, 2020 and Korean Patent Application 10-2021-0193056 filed Dec. 20, 2021 in the Korean Intellectual Property Office, the disclosure of which is incorporated herein in its entirety by reference.

TECHNICAL FIELD

This disclosure relates generally to the field of transportation services, and more particularly, to a method and system for generating an efficient driving route for a transportation vehicle providing a personal mobility service.

BACKGROUND

Routing problems have been extensively studied to provide efficient paths for transportation services, such as bus, train, package delivery, or the like. Conventionally, this class of problems is known as "traveling salesman" problem, which refers to finding the shortest possible route to visit each location only once, given a list of locations and a way to measure the traveling distance between two locations.

While existing methods provide a feasible solution to the conventional transportation services, such as finding the fastest route for delivering all packages by a truck driver, they are not applicable to a personal mobility service (PMS) system. PMS generally refers to a transport service where everyday operation is determined by the requirements of its users. For example, PMS involves passengers requesting a booking service, planning a route to pick up passengers (or products), and taking them to their required destination. Because a driver serves multiple passengers having their own origin and destination, the driving route typically consists of multiple destinations in a single trip. Therefore, the order of sub-trips requested by passengers must be taken into account in determining an efficient (e.g., the most profitable or fastest) route for the entire trip.

In another example, a vehicle operated for a food delivery service, such as DoorDash or Coupang Eats, may pick up and drop off food at multiple locations in a single trip. A driver may pick up a food product at restaurant A and deliver the product to a customer, then the same driver may pick up another food product at restaurant B and deliver the product to another customer. The single trip delivering the food products consists of some destinations that may not be reached before visiting a particular origin first, and as a consequence, the order of various sub-trips requested by customers must be taken into account in determining a driving route.

SUMMARY

In general, embodiments of the present invention provide system, method, and computer program product for generating an efficient driving route for a transportation vehicle providing a personal mobility service.

In accordance with an aspect of the invention, a method for generating a driving route for a vehicle providing a mobility service is provided. The method includes the steps of: receiving geolocation data associated with a plurality of nodes in a first group and a plurality of nodes in a second group, wherein each node in said first group forms a pair with a node in said second group; selecting a first node from a first candidate node group based on a current location of said vehicle; selecting a second node from a second candidate node group based on a location of said first node; selecting a third node from a third candidate node group based on said location of said first node and a location of said second node; and generating a driving route in an order of said first node, said second node, and said third node.

In accordance with another aspect of the invention, a method for generating a driving route for a vehicle providing a mobility service is provided. The method includes the steps of: receiving geolocation data associated with a plurality of nodes in a first group and a plurality of nodes in a second group, wherein each node in said first group forms a pair with a node in said second group; selecting a first node from said first group based on a current location of said vehicle; selecting a second node based on a location of said first node, wherein said second node is selected from at least one unselected node of said first group or a node paired with said first node; and generating a driving route in an order of said first node and said second node.

In accordance with another aspect of the invention, a method for generating a driving route for a vehicle providing a mobility service using clustering is provided: The method includes the steps of: receiving geolocation data associated with a plurality of nodes in a first group and a plurality of nodes in a second group, wherein each node in said first group forms a pair with a node in said second group; determining a plurality of middle points based said plurality of nodes in said first group and said plurality of nodes in said second group; creating at least one cluster using a clustering algorithm based on said plurality of middle points; determining a sequence for said at least one cluster based on proximity of said at least one cluster to a location of said vehicle; determining an entrance node and an exit node for each of the said at least one cluster; and generating a driving route based on said sequence and said entrance and exit node.

Hereinafter, various embodiments of the present invention will be described with reference to the accompanying drawings. These inventions may be embodied in many different forms and should not be construed as limited to the embodiments set forth herein. Rather, these embodiments are presented so that a person having ordinary skill in the art fully understands the scope of the invention. Detailed descriptions for well-known functions that will possibly obscure the subject matter of the invention have been omitted.

The terms used here are only used for illustrating, rather than limiting exemplary embodiments. As used herein, the singular forms may include the plural forms as well, unless the context clearly indicates otherwise. It should also be understood that when terms "comprise" and/or "include" are used, they indicate existence of the described steps, operations, components, elements and/or a combination thereof, but do not exclude existence of one or more other steps, operations, components, elements and/or a combination thereof.

Exemplary embodiments may be described with functional blocks and various processing steps. Some or all of such functional blocks may be implemented by any number of hardware and/or software units configured to perform specific functions. For example, exemplary embodiments may be implemented with one or more microprocessors or various kinds of integrated circuits configured to perform specific functions. The functional blocks may be implemented with any programming or script language. Similarly, the functional aspects may be implemented by an algorithm executed at one or more processors. In addition, the present disclosure may adopt traditional technologies for digital techniques, signal processing and/or control, data processing, and etc. The terms "mechanism," "element," "means," "units," etc. may be used broadly, not limited to mechanical and physical components.

BRIEF DESCRIPTION OF THE DRAWINGS

The figures herein depict exemplary embodiments of the present disclosure, and are provided to facilitate understanding of the present disclosure without limiting the scope or applicability of the present disclosure.

Furthermore, connecting lines or connectors shown in various figures merely represent exemplary functional relationships and/or physical or logical pairings between components. In an actual apparatus, connections between components may be established by various physical connectors, circuitry connectors, or alternative means of connecting functional components.

DETAILED DESCRIPTION

Overview

This disclosure relates to a method and system for generating an efficient driving route for a transportation vehicle providing a personal mobility service. A transportation vehicle (or simply a vehicle) may be a car, truck, bicycle, motorcycle, or the like that transport a payload. A payload may be a person or a product (e.g., food) being transported by the vehicle. The personal mobility service broadly refers to a service and associated resources that, through a data communication network, enable users to plan and book a transportation service at a convenient location and time. A plurality of transportation requests each comprising an origin and a destination is received from the users, a driving route is generated that visits all destinations of the plurality of transportation requests, and the driving route may be presented to the users. The driving route presented in this application can be applied to a wide range of personal mobility services, including car sharing, mobility-on-demand, demand responsive transport, mobility management, intermodal passenger transport, or delivery. In addition, a Traveling Salesman Problem (TSP) algorithm, such as such as Dijkstra algorithm, A* algorithm, or a bidirectional algorithm, may be used to select a node from available nodes for the method described below.

System Components and Data Flow

Figure 1:
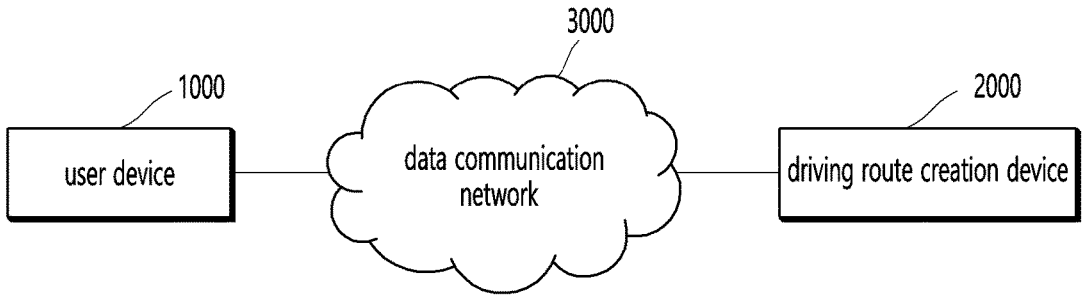
FIG. 1 illustrates an exemplary system architecture comprising a user device, a driver device and a driving route creation device for implementing various embodiments of the present invention.

Embodiments of the invention may be implemented within an exemplary system architecture such as that depicted in FIG. 1.

In one embodiment, a user device 1000 may include, but not limited to, a smart phone, a tablet, a personal computer, a cell phone, a personal digital assistant (PDA), a laptop computer, a media player, a micro server, a navigation device, a household appliance, a mobile device equipped with a digital camera, or a wearable device, such as a smart watch, smart glasses, or a smart ring, capable of performing data processing and communication. The user device 1000 may include a passenger device or a driver device. The user device 1000 may be used to request transporting any type of payload including one or more person or product.

A driving route creation device 2000 may be implemented using one or more computers capable of providing program commands, files, contents, and/or services through a data communication network.

The driving route creation device 2000 may provide a driving route to the user device 1000 by determining the order of the locations to visit based on the geolocation data (Global Positioning System (GPS), cellular signals, Wi-Fi, or the like) of a plurality of payloads.

The user device 1000 may be coupled to (and communicate with) the driving route creation device 2000 though the data communication network 3000. An application program for a user may be installed in the user device 1000. The application program is capable of sending and receiving data to/from the driving route creation device 2000 over a data communication network 3000. Each user device 1000 may include at least one graphical display and user interface allowing the passenger or the driver to view and interact with applications and other programs of the user device 1000.

The data communication network 3000 may provide a communicative interface between the user device 1000 and the driving route creation device 2000, and may comprise any public or private network, such as a local area network (LAN), wireless local area network (WLAN), wide area network (WAN), virtual private network (VPN), cellular network (implementing GSM, CDMA, 3G, 4G, LTE, 5G, etc.), Wi-Fi, Wi-Fi Direct, Bluetooth, infrared data association (IrDA), near field communication (NFC), Intranet, Intranet, or any other network architecture or system that facilitates communications in a network environment. Regardless of the type of network standard employed, the data communication network 3000 is capable of providing a reliable data communication for the user device 1000 connected to the driving route creation device 2000.

Although various embodiments may include any number of user devices, the exemplary system in FIG. 1 depicts only one user device 1000 connected with the driving route creation device 2000 for purposes of explanation.

Figure 2A:
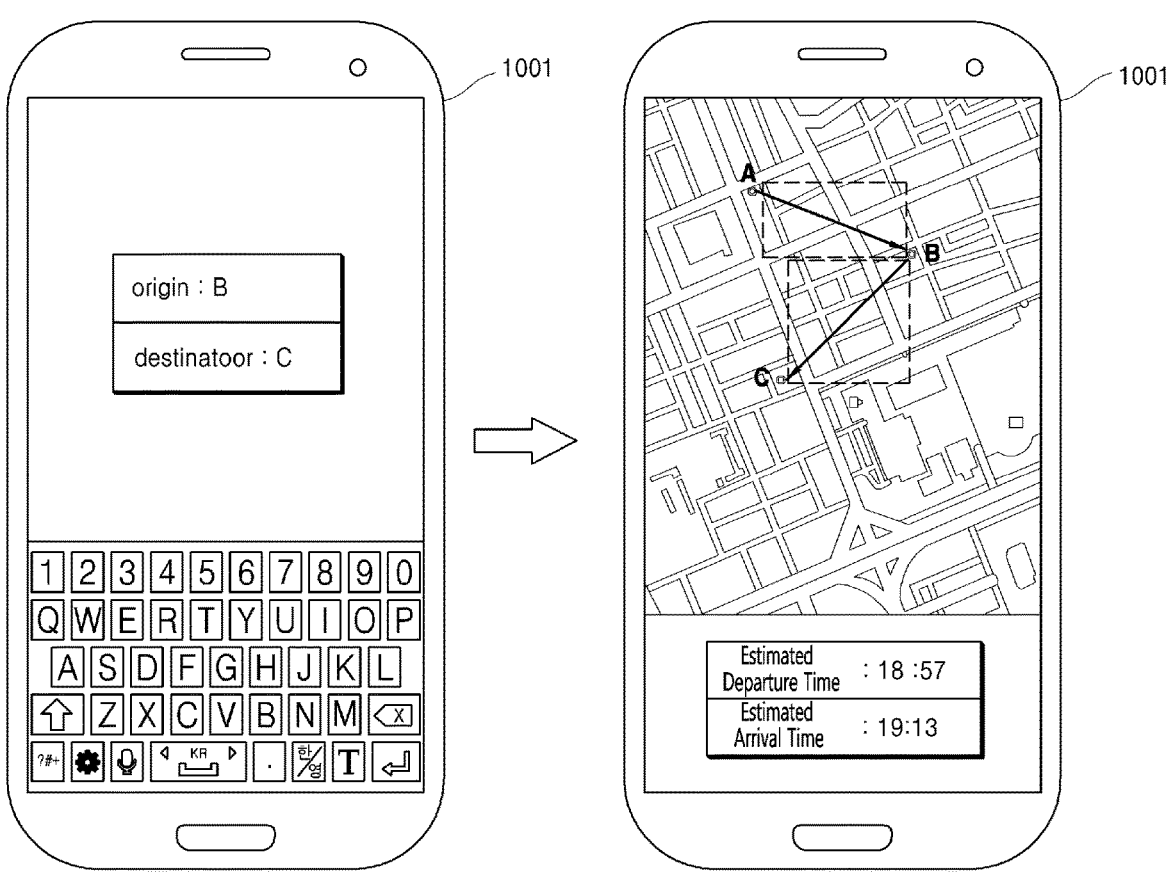
FIG. 2a and FIG. 2b show a user device capable of transmitting and receiving data in accordance with certain embodiments of the present invention.
Figure 2B:
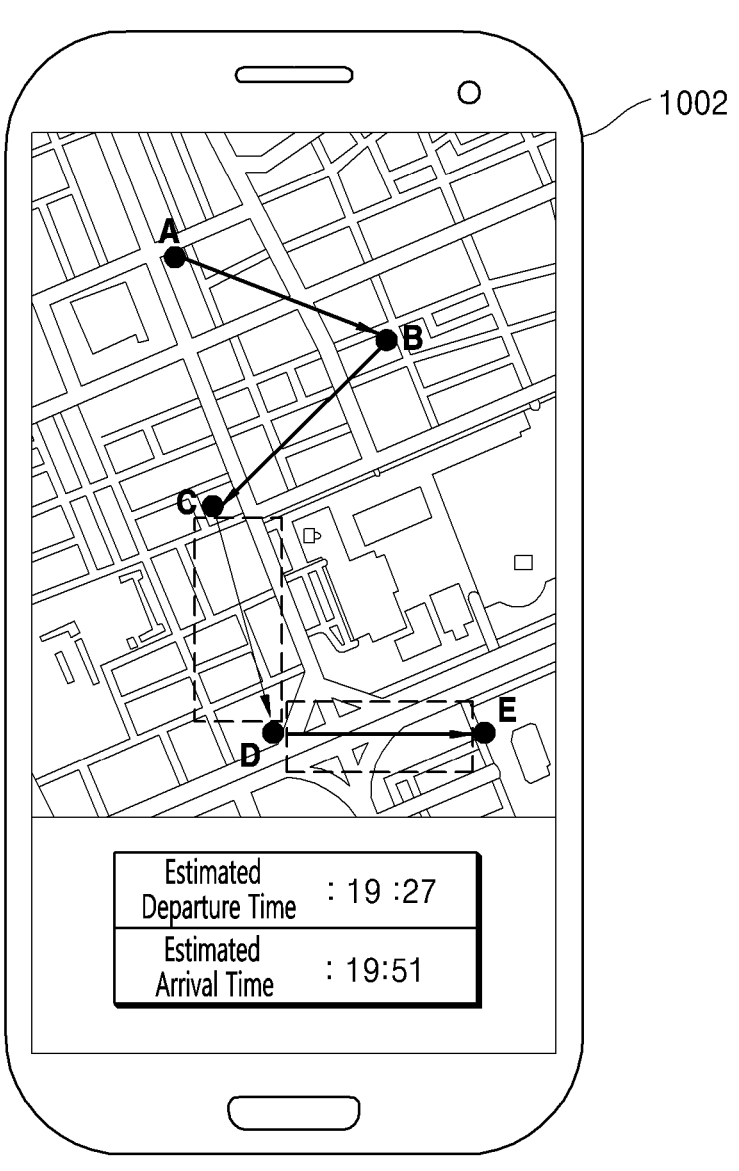

FIG. 2a and FIG. 2b show a user device capable of transmitting and receiving data in accordance with certain embodiments of the present invention. User device in FIG. 2a and FIG. 2b are the same user device 1000 as described in FIG. 1. Therefore, detailed descriptions thereof are omitted to avoid duplication.

Referring to FIG. 2a, a first user device 1001 may receive an origin and a destination entered by a first user. For example, the first user may enter B as an origin and C as a destination.

The first user device 1001 may send a first trip data comprising the origin and the destination to the driving route creation device 2000. The origin and destination of the user refer to a pick-up and drop-off location of a payload (e.g., a passenger or product). The first trip data may further include, but not limited to, the time the origin and destination are entered by the first user, name of the origin, latitude and longitude of the origin, name of a destination, latitude and longitude of the destination, or the like.

The driving route creation device 2000 may generate a first driving route based on the first trip data received from the first user device 1001. The driving route may be turn-by-turn directions on a map but other driving directions may be used (e.g., audio directions). The driving route creation device 2000 may transmit the first driving route to the user device 1001. The user device 1001 displays the first driving route on the screen.

The first driving route displayed on the screen of the user device 1001 may be created from the trip data of the user as well as a location of the vehicle. For example, the driving route creation device 2000 may generate the first driving route from node A to node B, wherein node A is an initial node of the vehicle and node B is an origin input by the user. The initial node of the vehicle may be the location of the vehicle when the driving route creation device 2000 receives the first trip data from the first user device 1001 or when the origin and destination is entered into the first user device 1001.

For the sake of convenience, a straight line is used to indicate the trip from node A to node B and from node B to node C in FIG. 2a. However, an actual driving route between the two nodes may be generated along the roads that is to be traveled by the vehicle.

The driving route creation device 2000 may calculate a first estimated departure time and a first estimated arrival time for the first driving route. The first estimated departure time is the time measured for the vehicle to arrive at node B from node A, and the first estimated arrival time is the time measured for the vehicle to arrive at node C from node B. The driving route creation device 2000 may calculate those times in view of the actual distance of the first driving route, traffic condition (e.g., congestion), and/or optional parameters (e.g., shortest distance, shortest travel time, etc.). The driving route creation device 2000 may send the first estimated times to the user device 1001.

The driving route creation device 2000 may create a second driving route based on a second trip data entered by a second user. Referring to FIG. 2b, the second user may enter D as an origin and E as a destination. The second user device 1002 may send the second trip data comprising the origin D and destination E to the driving route creation device 2000. For purposes of explanation, it is assumed that the driving route creation device 2000 receives the second trip data from the second user device after receiving the first trip data from the first user device 1001. The driving route creation device 2000 may create the second driving route as well as estimated times based on the second trip data received from the second user device using the same method for creating the first driving route. For example, the driving route creation device 2000 may calculate a second estimated departure time and a second estimated arrival time for the second trip. The second estimated departure time is the time measured for the vehicle to arrive at D from C, and the second estimated arrival time is the time measured for the vehicle to arrive at D from E. The driving route in FIG. 2b visits nodes in order of A-B-C-D-E. However, a route may be created by determining the order using Nearest Insertion, Cheapest Insertion, Farthest Insertion, Random Insertion, or Evolutionary algorithm.

In addition, the driving route creation device 2000 may create a third driving route by combining the second driving route to the first driving route. For example, after receiving the second trip data from the second user device, the driving route creation device 2000 may calculate the driving route from the end of the first trip (from C) to the beginning of the second trip (to D), and add the second route (from D to E) to the first route (from B to C). The third driving route may comprise an entire trip from A to B, B to C, C to D, and D to E.

Meanwhile, the driving route creation device 2000 may additionally acquire traffic conditions and road quality of the area where each node (origin or destination) in a trip is located. The acquired location data and additional information (e.g., traffic condition) may be used for implementing various embodiments of the present invention. For example, the driving route creation device 2000 may create a fastest route or a shortest route in consideration of the situation where the vehicle is hard to move from one location to another location due to a traffic jam or poor road quality.

The road quality may be classified based on certain attributes. In an exemplary embodiment, the attributes may be, without limitation, type of road, volume of traffic, width of road, and length of road. Based on the attributes, a road may be classified from class 1 to class 9, wherein class 1 is the highest quality and class 9 is the lowest quality. Driving connectivity between the roads with the same level of quality may be guaranteed.

Figure 3:
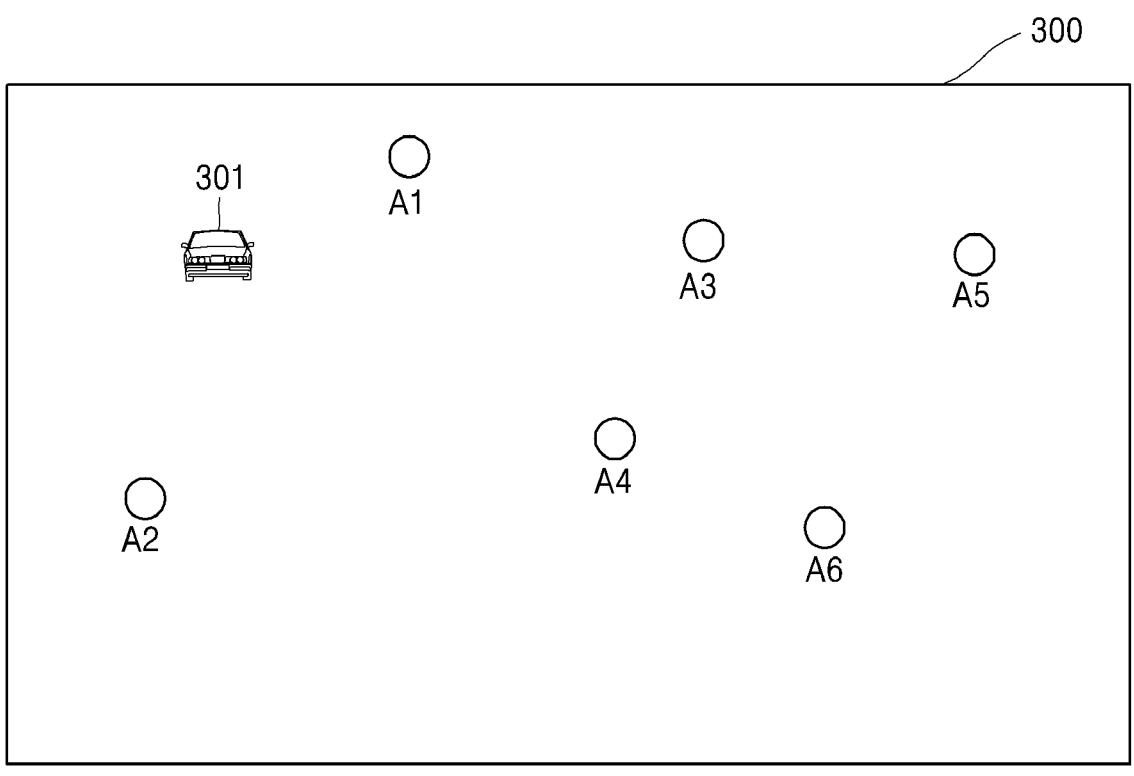
FIG. 3 illustrates travelling salesman problem in accordance with certain embodiments of the present invention.

FIG. 3 illustrates travelling salesman problem. The traveling salesman problem (TSP) is a problem in combinatorial optimization. TSP is to find a minimal cost tour visiting all nodes in any order. Referring to FIG. 3, the driving route device 2000 may acquire location information of multiple nodes (A1~A6) in map 300. The location information may include, but not limited to, longitude and latitude of each node. The driving route device 2000 may generate a driving route that visits all nodes for the vehicle 300 based on the algorithms designed for TSP. The generated driving route may be a path with the shortest distance or fastest travel time.

Creating Driving Route Based on Origin-Destination Relationship

A driver receives a plurality of transportation requests comprising an origin and a destination in a personal mobility service environment. The origin included in the transportation request is paired with the destination, and there is a plurality of origin-destination pairs on a route that the driver needs to travel. In generating a driving route for transporting multiple passengers (or products) departing at different locations, for example, the order and location of origins and destinations need to be considered.

Figure 4:
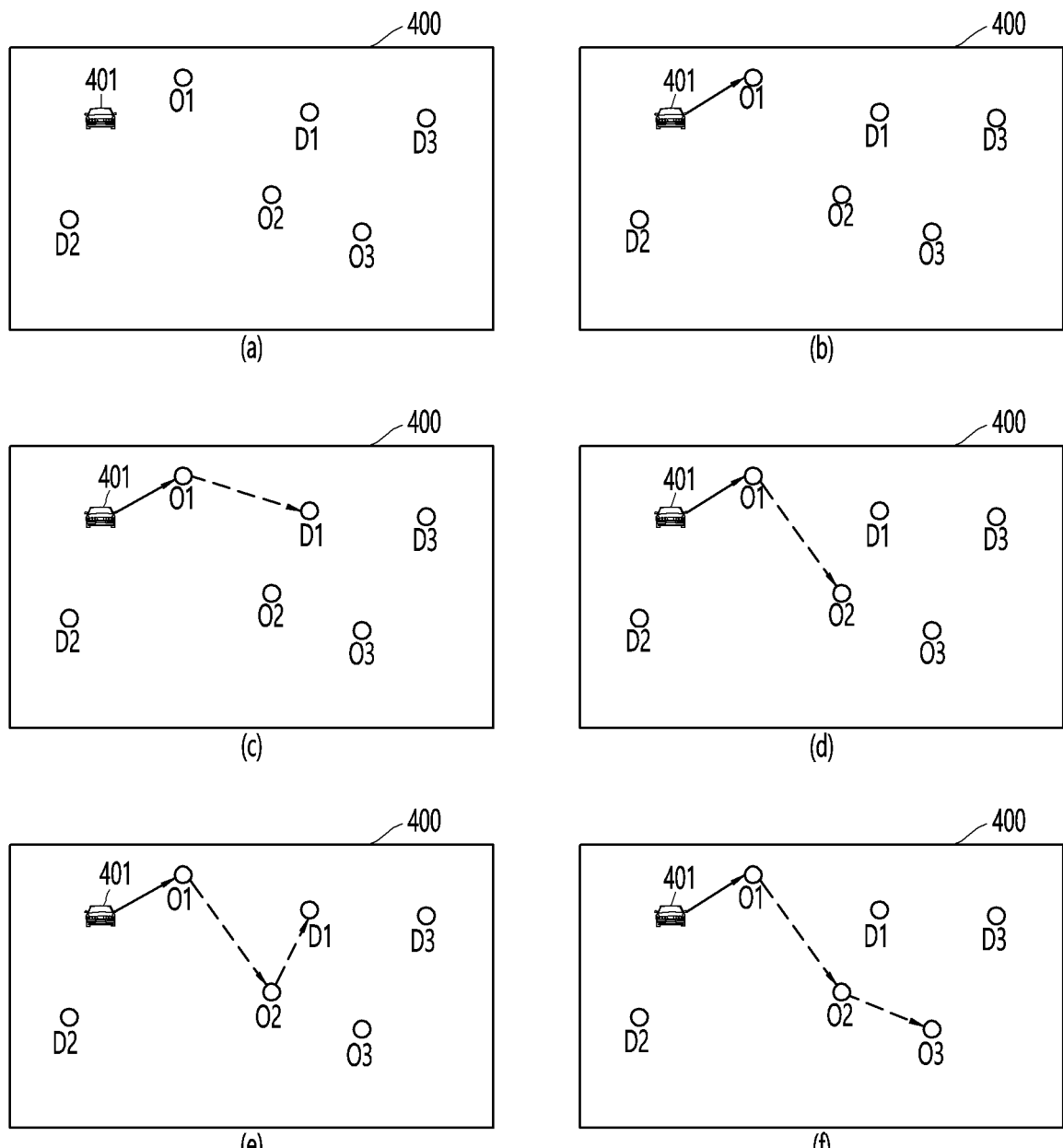
FIG. 4 illustrates a driving route generated for a vehicle providing a personal mobility service in accordance with certain embodiments of the present invention.

FIG. 4 illustrates a driving route generated for a vehicle providing a personal mobility service in accordance with certain embodiments of the present invention.

In this exemplary embodiment, a driver is allowed to pick up another passenger while transporting a passenger. For example, referring to FIG. 4($a$), (1) if $O_1$ and $D_1$ are an origin and a destination, respectively, for passenger A, and (2) if $O_2$ and $D_2$ are an origin and a destination, respectively, for passenger B, then a vehicle 401 with passenger A already on board is allowed to move to $D_1$ or $O_2$ because $D_1$ is the destination of the passenger A and $O_2$ is the origin of passenger B. Meanwhile, the vehicle 401 is not allowed to move to $D_2$ since that is the destination of passenger B. In other words, a passenger B pick-up must precede a passenger B drop-off.

The driving route creation device 2000 may acquire location data of a plurality of nodes on a map. The plurality of nodes may be classified into either a first group or a second group. Without limiting the types of nodes that can be included, the first group may include origins and the second group may include destinations.

Referring to FIG. 4($a$), $O_1$, $O_2$, and $O_3$ (origins) may be included in the first group, and $D_1$, $D_2$, and $D_3$ (destinations) may be included in the second group. In addition, a pair may be formed between a node in the first group and a node in the second group. For example, $O_1$ and $D_1$, $O_2$ and $D_2$, $O_3$ and $D_3$, may form three pairs. In other words, the pair refers to an origin and a destination of a trip of a passenger.

The driving route creation device 2000 may select a first node from the first group based on the current location of the vehicle 401. Referring to FIG. 4($b$) the driving route creation device 2000 may select $O_1$ as the first node because $O_1$ is the closest node from the vehicle 401 among $O_1$, $O_2$ and $O_3$.

In an exemplary embodiment, the vehicle 401 departed from an origin may visit a destination paired with the origin. More specifically, given that $O_1$ is selected as the first node, the driving route creation device 2000 may select $D_1$, among $D_1$, $D_2$, and $D_3$, as a second node, then may generate the driving route that starts from the first node $O_1$ and ends in the second node $D_1$ as shown in FIG. 4($c$).

In another embodiment, the vehicle 401 departed from a first origin may visit a second origin before the vehicle 401 reaches a destination paired with the first origin. More specifically, the driving route creation device 2000 may select a second node from at least one unselected node in the first group based on the current location of the vehicle 401. For example, referring to FIG. 4($d$), given that $O_1$ is selected as the first node, the driving route creation device 2000 may select $O_2$, between $O_2$ and $O_3$, as the second node because $O_2$ is the closest node from $O_1$.

After the second node is determined, the driving route creation device 2000 may select a third node based on the location of the second node and the location of the first node. In this case, the third node is selected from a node (from the second group) that is paired with the first node and a node that is paired with the second node. For example, referring to FIG. 4($e$), given that $D_1$ is paired with $O_1$($O_1$ being the first node), and $D_2$ is paired with $O_2$ ($O_2$ being the second node), the driving route creation device 2000 may select $D_1$ between $D_1$ and $D_2$ as the third node because the distance between $D_1$ and $O_2$ is closer than the distance between $D_2$ and $O_2$.

Then, the driving route creation device 2000 may generate a driving route in the order of the first node, the second node, and the third node for the vehicle 401.

In another embodiment, the vehicle 401 departed from a first origin may visit either a second origin or a destination paired with the first origin. In other words, given that a first node is selected, the driving route creation device 2000 may select a second node from (1) at least one unselected node of the first group or (2) a destination node paired with the first node, which is a node in the second group, based on the current location of the first node.

If the second node is selected from the first group, the driving route creation device 2000 may select a third node from (1) at least one unselected node of the first group, (2) a node paired with the first node, or (3) a node paired with the second node.

For example, given that $O_2$ (first group node) is selected as the second node, the third node may be select from $O_3$ (unselected first group node), $D_1$ (node paired with $O_1$), and $D_2$ (node paired with $O_2$). The driving route creation device 2000 may select $D_1$ as the third node because $D_1$ is the closest node from $O_2$.

If the second node is selected from the second group, the driving route creation device 2000 may first determine at least one unselected node in the first group, and select the closest node from the second node as a third node. For example, referring to FIG. 4($f$), given that $O_1$ is selected as the first node and $D_1$ is selected as the second node, the driving route creation device 2000 may select the third node from either $O_2$ or $O_3$ (unselected node in the first group) based on the distance between $D_1$ and $O_2$ and $D_1$ and $O_3$.

Then, the driving route creation device 2000 may generate a driving route in the order of the first node, the second node, and the third node for the vehicle.

The driving route creation device 2000 may create a new driving route using the method described above when a new pair of nodes has been added. The new driving route is created using the new pair of nodes as well as all existing nodes.

Creating Driving Route Using Weight Value

Figure 5:
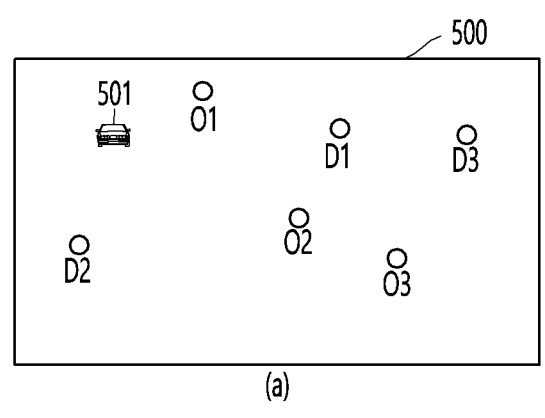
FIG. 5 illustrates a driving route generated for a vehicle providing a personal mobility service using a weight value in accordance with certain embodiments of the present invention.
Figure 5:
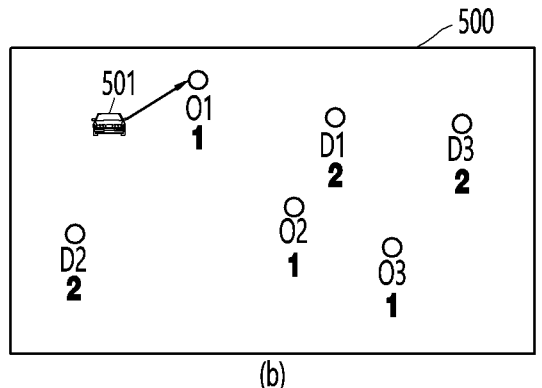
Figure 5:
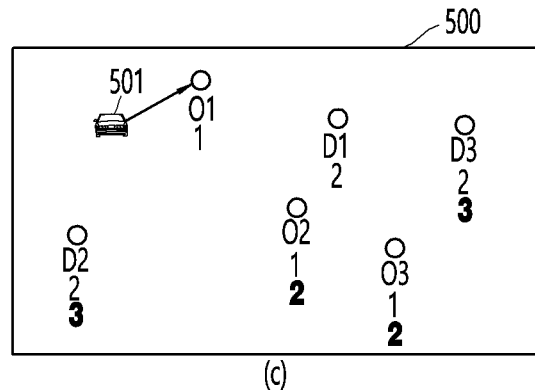
Figure 5:
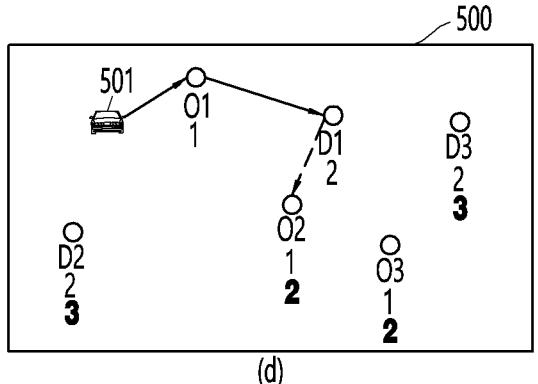
Figure 5:
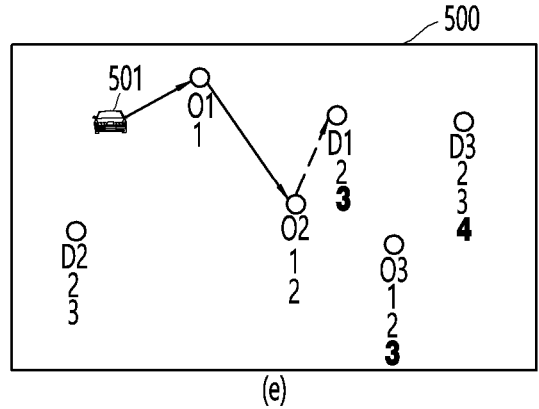

FIG. 5 illustrates a driving route generated for a vehicle providing a personal mobility service using a weight value of each node in accordance with certain embodiments of the present invention.

Referring to FIG. 5, the driving route creation device 2000 may acquire location data of a plurality of nodes on the map 500. Each node in the plurality of nodes may be an element of either a first group and a second group. The first group may include but not limited to origin nodes, and the second group may include but not limited to destination nodes.

Referring to FIG. 5($a$), origin nodes $O_1$, $O_2$, and $O_3$ are in a first group, destination nodes $D_1$, $D_2$, and $D_3$ are in a second group. Each node in the first group may form a pair with each node in the second group. For example, $O_1$ and $D_1$, $O_2$ and $D_2$, and $O_3$ and $D_3$, may form pairs.

Referring to FIG. 5($b$), the driving route creation device 2000 may assign an initial weight $w_0$ to the nodes in the first group, and $w_0+1$ to the nodes in the second group. For example, the driving route creation device 2000 assigns ($w_0$)=1 to $O_1$, $O_2$, and $O_3$, and ($w_0+1$)=2 to $D_1$, $D_2$, and $D_3$.

The driving route creation device 2000 may select a first node from the nodes whose weight is 1 based on the current location of the vehicle 401. For example, among $O_1$, $O_2$, and $O_3$, the driving route creation device may select $O_1$, which is the closest origin node from the vehicle 401, as the first node.

After selecting the first node, the driving route creation device 2000 may update the weight of the nodes in the first group to $w_0+1$ except for the first node, and the weight of the nodes in the second group to $w_0+2$ except for the node paired with the first node. Referring to FIG. 5(*c*), the driving route creation device 2000 updates the weights of $O_2$ and $O_3$ to 2, and the weight of $D_2$ and $D_3$ to 3. The weight of $D_1$ that is paired with $O_1$ has not changed. Then, the driving route creation device 2000 may select a second node from the nodes whose weight is $w_0+1$ based on the location of the first node. The second node may be a first group node or a second group node. For example, in FIG. 5(*c*), the driving route creation device 2000 may select either $O_2$, $O_3$, or $D_1$, whose weight is 2, as the second node.

In an embodiment, when the second node is selected from the second group, the driving route creation device 2000 may select a third node from the nodes whose weight is $w_0+1$. Referring to FIG. 5(*d*), when $D_1$ is selected as the second node, the driving route creation device 2000 may select $O_2$ between $O_2$ or $O_3$ as the third node because the distance between $D_1$ and $O_2$ is closer than the distance between $D_1$ and $O_3$.

In another embodiment, when the second node is selected from the first group, the driving route creation device 2000 may update the weight of the nodes in the first group to $w_0+2$ except for the first node and the second node. The driving route creation device 2000 may further update the weight of the nodes (in the second group) paired with the first node and the third node to $w_0+2$, and the weight of the remaining nodes in the second group to $w_0+3$. Then, the driving route creation device 2000 may select a second node from the nodes whose weight is $w_0+2$ based on the location of the third node. Referring to FIG. 5(*e*), when $O_2$ is selected as the second node, the driving route creation device 2000 may update the weight of $O_3$ to 3 because $O_3$ is the remaining node in the first group after the first node $O_1$ and the second node $O_2$ are selected. The driving route creation device 2000 may further update the weight of $D_1$ (paired with $O_1$) and $D_2$ (paired with $O_2$) to 3, and weight of $D_3$ to 4. After updating the weights, the driving route creation device 2000 may select $D_1$, among $D_1$, $D_2$, or $O_3$, as the third node whose weight is 3.

Finally, the driving route creation device 2000 may generate a driving route in the order of the first node, the second node, and the third node for the vehicle 401.

Creating Driving Route Using Clustering

Figure 6:
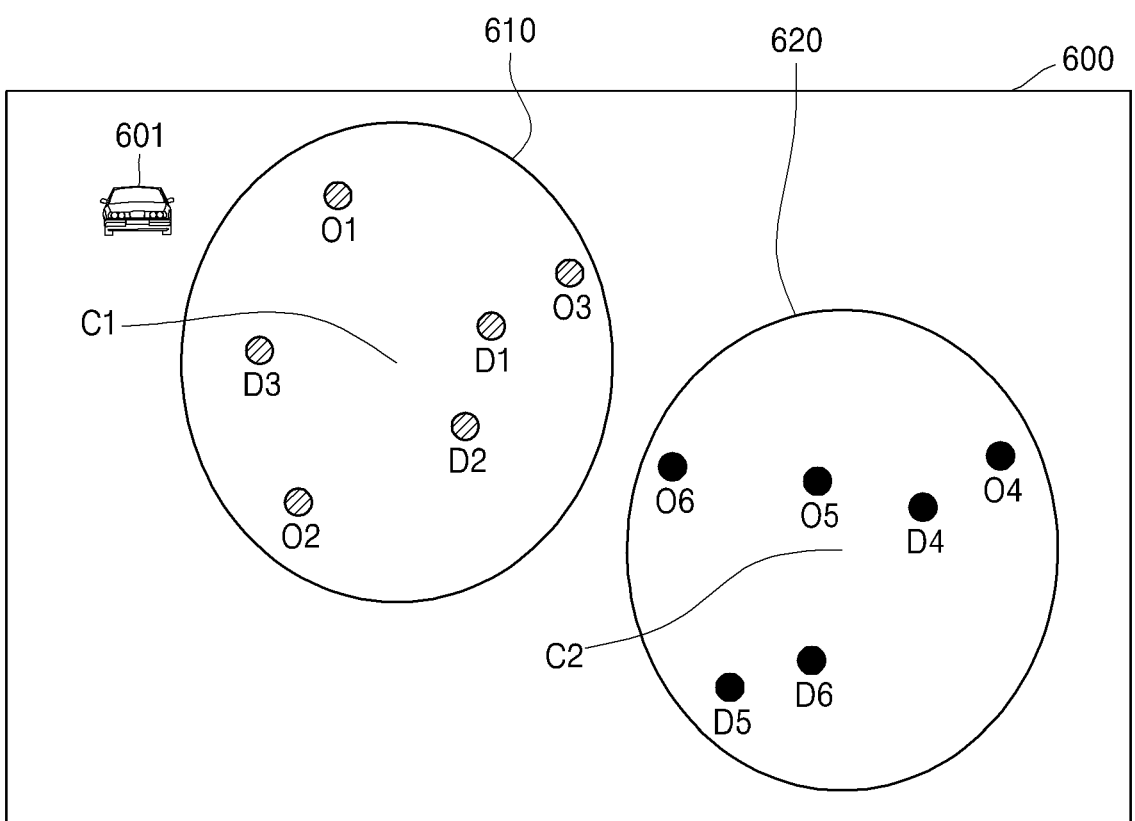
FIG. 6 illustrates a driving route generated for a vehicle providing a personal mobility service using clustering in accordance with certain embodiments of the present invention.

FIG. 6 illustrates a driving route generated using clustering in accordance with certain embodiments of the present invention.

Referring to FIG. 6, the driving route creation device 2000 may acquire location data of a plurality of nodes on a map. Origin nodes $O_1$, $O_2$, $O_3$, $O_4$, $O_5$, and $O_6$ may be included in a first group, and destination nodes $D_1$, $D_2$, $D_3$, $D_4$, $D_5$, and $D_6$ may be included in a second group. A pair between an origin node and a destination node may be formed. In other words, each node in the first group forms a pair with each node in the second group. For example, $O_1$ and $D_1$, $O_2$ and $D_2$, $O_3$ and $D_3$, $O_4$ and $D_4$, $O_5$ and $D_5$, and $O_6$ and $D_6$ form six pairs.

In addition, the driving route creation device 2000 may create at least one cluster for the pairs using a clustering algorithm, such as k-means++. A middle point between an origin and a destination may be chosen as a location of each origin and destination pair and used as a data point in calculating a centroid or a center of each cluster. For example, when six middle points of $O_1$-$D_1$, $O_2$-$D_2$, $O_3$-$D_3$, $O_4$-$D_4$, $O_5$-$D_5$, and $O_6$-$D_6$ pairs are fed into the clustering algorithm with k=2, three pairs $O_1$-$D_1$, $O_2$-$D_2$, $O_3$-$D_3$ may be clustered into the cluster 610, and another three pairs $O_4$-$D_4$, $O_5$-$D_5$, $O_6$-$D_6$ may be clustered into the cluster 620.

The driving route creation device 2000 may generate a driving route that visits all nodes of the at least one cluster. First, the driving route creation device 2000 may determine a sequence of clusters to visit based on proximity of the vehicle 601 to the centroid of each cluster. In other words, a cluster close to the vehicle 601 is visited before another cluster far from the vehicle 601. For example, the vehicle 601 in FIG. 6 may first visit the cluster 610 and then visit the cluster 620 because the distance between the vehicle 601 and a centroid C1 is shorter than the distance between the vehicle 601 and a centroid C2. An estimated time of arrival (ETA) may also be used instead of distance in determining the sequence.

Next, the driving route creation device 2000 may determine an entrance node and an exit node of each cluster. Except for the entrance node of a first cluster and the exit node of a last cluster, the entrance node and the exit node of consecutive clusters are determined by measuring the proximity between destination nodes of one cluster and origin nodes of another cluster in the sequence.

In an exemplary embodiment, the entrance node of the first cluster is determined by selecting an origin node of the first cluster that is closest from a vehicle's current location. For example, referring to FIG. 6, given that the cluster 610 is the first cluster, $O_1$ may be selected, among origin nodes $O_1$, $O_2$, and $O_3$ in the cluster 610, as the entrance node of the cluster 610. The exit node of the last cluster is determined by selecting a destination node of the last cluster that is farthest from the vehicle's current location. For example, given that the cluster 620 is the last cluster, $D_6$ may be selected, among destination nodes $D_4$, $D_5$, and $D_6$, as the exit node of the cluster 620.

After the entrance node of the first cluster and the exit node of the last cluster are determined, the destination node and the origin node having the shortest distance between them may be selected for the entrance and exit node for each of the at least one cluster. For example, the driving route creation device 2000 may measure the distance between $D_1$, $D_2$, and $D_3$ of the cluster 610 and $O_4$, $O_5$, and $O_6$ of the cluster 620, and select $D_2$ as the exit node of cluster 610 and $O_6$ as the entrance node of cluster 620 after comparing all possible combinations between $D_1$, $D_2$, and $D_3$ in the cluster 610 and $O_4$, $O_5$, and $O_6$ in the cluster 620.

Finally, the driving route creation device 2000 may determine the order of nodes to visit in each cluster using the methods explained with reference to FIGS. 4-5.

Figure 7:
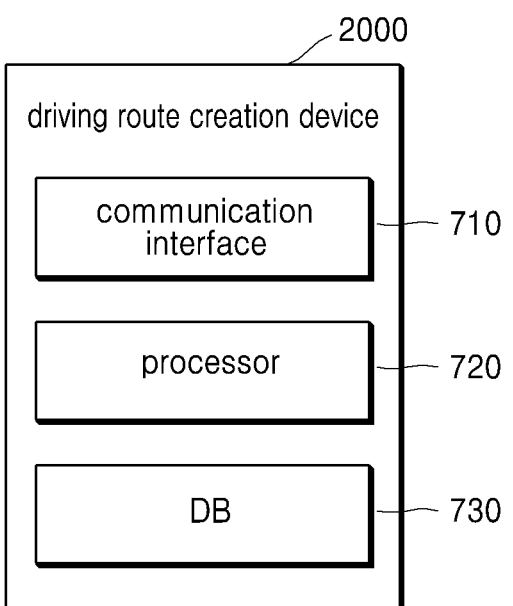
FIG. 7 is a block diagram of a driving route creation device in accordance with certain embodiments of the present invention.

FIG. 7 is a block diagram of a driving route creation device in accordance with certain embodiments of the present invention. In general, the term server may refer to any computing device including, desktop, laptop, mobile phone, server, distributed system, wearable device, cloud-based processing device, or combination thereof adapted to perform the functions described herein. As will be understood from this figure, in one exemplary embodiment, the driving route creation device 2000 may include a communication interface 710, a processor 720, and a database (DB) 730. It is to be noted that only the components associated with the exemplary embodiments of the present disclosure are depicted in the figure. Additional components that work together to perform functions described herein may be apparent to those skilled in the art.

The communication interface 710 may include one or more components enabling the driving route creation device 2000 to communicate with the user device 1000 of FIG. 1 using any type of digital network technology, such as a local area network (LAN), wireless local area network (WLAN), wide area network (WAN), virtual private network (VPN), cellular network (implementing GSM, CDMA, 3G, 4G, LTE, 5G, etc.), Intranet, Internet, or any suitable combination thereof.

The DB 730 may store any suitable data or information processed by the driving route creation device 2000, including user information, driving route information, payment information, and instructions to achieve the operations detailed in this specification. The DB 730 may comprise any form of non-volatile or volatile memory including, without limitation, random access memory (RAM), read-only memory (ROM), EEPROM (electrically erasable programmable read-only memory), magnetic media (e.g., one or more disk or tape drives), CD-ROM, Blue-ray, or any other optical media, solid state memory (e.g., flash memory), removable media, or any other suitable local or remote memory component or components.

The processor 720 may manage the overall control of the driving route creation device 2000. In one example, the processor 720 may be configured to control one or more functions of one or more elements of the user interface (not shown), display interface (not shown), communication interface 710, and DB 730 through computer program instructions stored on DB 730. In addition, the processor 720 may control at least one operation detailed in FIGS. 1-6. In another example, the processor 720 may be implemented with ASICs (application specific integrated circuits), DSPs (digital signal processors), DSPDs (digital signal processing devices), PLDs (programmable logic devices), FPGAs (field programmable gate arrays), controllers, micro-controllers, microprocessors, or any suitable combination thereof.

Figure 8:
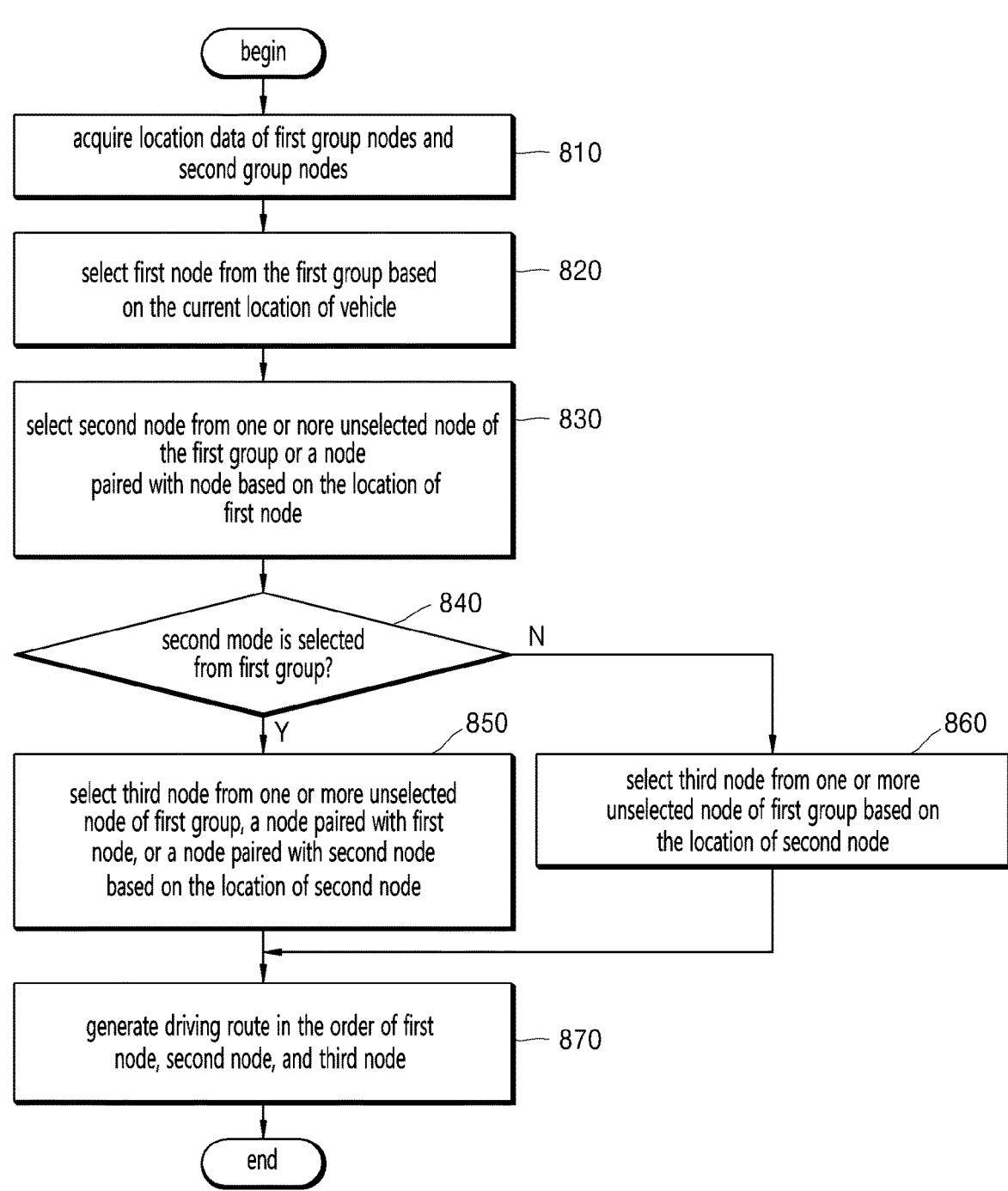
FIG. 8 is a flowchart illustrating a method for generating a driving route in accordance with certain embodiments of the present invention.

FIG. 8 is a flowchart illustrating a method for generating a driving route in accordance with certain embodiments of the present invention. Because the process described in FIG. 8 is associated with the embodiments of the present disclosure described above, the methods, processes, and techniques described with reference to FIGS. 1-6 may be applied herein.

At step 810, the processor 720 acquires location data of a plurality of nodes in a first group and a plurality of nodes in a second group. The first group includes, without limitation, origin nodes, and the second group includes, without limitation, destination nodes. The location data may include at least longitude and latitude of each node.

At step 820, the processor 720 may select a first node from the first group based on the current location of a vehicle.

At step 830, the processor 720 may select a second node based on a location of the first node, wherein the second node is selected from at least one unselected node in the first group or a node paired with the first node.

At step 840, the processor 720 may determine if the second node is selected from the first group.

If the second node is selected from the first group, step 850 may be executed.

At step 850, the processor 720 may select a third node based on a location of the second node, wherein the second node is selected from at least one unselected node in the first group, a node paired with the first node, or a node paired with the second node.

If the second node is selected from the second group, step 860 may be executed.

At step 860, the processor 720 may select a third node based on the location of the second node from at least one unselected node of the first group.

At step 870, the processor 720 may generate a driving route in the order of the first node, the second node, and the third node.

Figure 9:
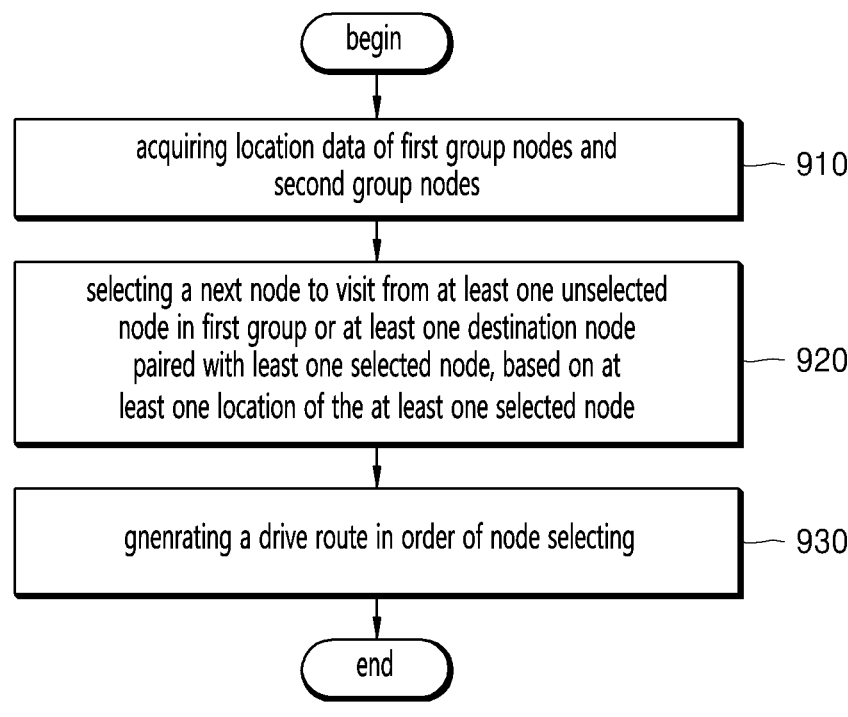
FIG. 9 is a flowchart illustrating a strategy of selecting a next node to visit in accordance with certain embodiments of the present invention.

FIG. 9 is a flowchart illustrating a strategy of selecting a next node to visit in accordance with certain embodiments of the present invention. Because the process described in FIG. 9 is associated with the embodiments of the present disclosure described above, the methods, processes, and techniques described with reference to FIGS. 1-8 may be applied herein.

At step 910, processor 720 may acquire location data of a plurality of nodes in a first group and a plurality of nodes in a second group.

At step 920, processor 720 may select a next node to visit from at least one unselected node in the first group or at least one destination node paired with at least one selected node based on at least one location of the at least one selected node.

The present invention is designed in such a way that a second group node (destination node) is not selected until a first group node (origin node) paired with the second group node is selected, and a node that is already selected or included in a driving route is not selected again.

For example, referring to FIG. 4, assume that origin nodes $O_1$, $O_2$ and $O_3$ are in a first group, destination nodes $D_1$, $D_2$, and $D_3$ are in a second group, and $O_1$ and $D_1$, $O_2$ and $D_2$, and $O_3$ and $D_3$ form pairs. If $O_1$ was previously selected, $O_2$ is currently selected, and all other nodes are not yet selected, then the processor 720 may select a next node from $D_1$ that is paired with $O_1$, $D_2$ that is paired with $O_2$, or an unselected first group.

In another example, when $D_1$ is currently selected, which implies that $D_1$'s pair $O_1$ is already selected, based on the design principal of the node selection process described above, the processor 720 may select an unselected node $O_2$ or $O_3$ in the first group as the next node to visit.

At step 930, processor 720 may generate a drive route in order of node selection. For example, if the order of node selection is $O_1$, $D_1$, and $O_2$, processor 720 may generate a driving route in such a way that the vehicle 401 visits nodes in the order of $O_1$, $D_1$, and $O_2$, Various embodiments of the present invention can be implemented as a computer program. The computer program may be a software program specifically developed for the present invention or built from publicly available software programs. In addition, the computer program may be implemented in any programming language, such as machine language or a high-level programming language. The programming language may be a compiled or interpreted programming language.

The present invention includes a computer program product which is a storage medium having instructions stored thereon which when executed cause a computer to perform any of the processes of the present invention. The storage medium may be, for example, but not limited to, an electronic, magnetic, optical, or any suitable combination thereof.

The computer program product may be delivered via physical data storage media to end customer, or downloaded from an online application store (e.g., Google Play Store) or directly from another user's device. In case of online distribution, at least one part of a computer program may be cached in a server of a manufacturer, server of the application store, or a hosting server.

Various steps of the method in various embodiments in the present invention may be carried out without a particular order, unless the context clearly indicates otherwise. Examples used in embodiments of the present invention are not to be construed as a limitation on other ways of making the present invention. Also, any person with ordinary skill in the art may implement the present invention by removing or changing some modules if necessary, and it will be apparent that the scope of the present invention should be determined in accordance with the claims herewith.

While the invention has been shown and described with respect to the embodiments, the present invention is not limited thereto, it will be understood by those skilled in the art that various changes and modifications may be made without departing from the scope of the invention as defined in the following claims.

The invention claimed is:

1. A method for generating a driving route for a navigation device of a vehicle providing a mobility service comprising:
providing a first application for installation on said navigation device of said vehicle, wherein said first application is configured to determine a current location of said vehicle using a Global Positioning System (GPS);
providing a second application for said installation on a mobile device of at least one user, wherein said second application is configured to transmit geolocation data;
receiving, by a route creation device, said geolocation data associated with a plurality of nodes in a first group and a plurality of nodes in a second group from said mobile device and said current location from said navigation device over a data communication network, wherein each node in said first group forms a pair with a node in said second group;
creating, by said route creation device, at least one cluster using a clustering algorithm based on a plurality of middle points based on said plurality of nodes in said first group and said plurality of nodes in said second group;
determining, by said route creation device, a visiting sequence of said at least one cluster based on said current location of said vehicle and a centroid of each of said at least one cluster;
selecting, by said route creation device, a first node from a first candidate node group included in a cluster determined to be visited first among said at least one cluster, based on said current location of said vehicle;
selecting, by said route creation device, a second node from a second candidate node group based on a location of said first node;
selecting, by said route creation device, a third node from a third candidate node group based on said location of said first node and a location of said second node;
generating, by said route creation device, a driving route in an order of said first node, said second node, and said third node; and
restricting, by said route creation device, a movement of said vehicle based on said generated driving route to enforce a pickup and drop-off order constraint,
wherein a plurality of nodes in said first candidate node group are included in said cluster determined to be visited first;
transmitting, by said route creation device, said driving route comprising travel time information over said data communication network to said navigation device, causing said first application to display said driving route on said navigation device, wherein a travel time to said first node is determined from said current location, and travel times among said first, second, and third nodes are determined based on road quality information in a database of said route creation device,
wherein the determining of visiting sequence comprises:
determining, by said route creation device, based on said current location of said vehicle, an entrance node of a cluster determined to be visited first and an exit node of a cluster determined to be visited last among said at least one cluster;
calculating, by said route creation device, distances for all combinations between at least one node of said second group included in a previously visited cluster among said at least one cluster and at least one node of said first group included in a next cluster to be visited among said at least one cluster; and
determining, by said route creation device, among said all combinations, a node of said first group of said previously visited cluster included in a combination having a shortest distance as the exit node of said previously visited cluster, and determining a node of said second group of said next cluster to be visited in said combination having a shortest distance as the entrance node of said next cluster to be visited.

2. The method of claim 1:
wherein said first candidate node group is said first group;
wherein said second candidate node group is generated by selecting at least one unselected node of said first group; and
wherein said third candidate node group is generated by selecting a node paired with said first node and a node paired with said second node.

3. The method of claim 1:
wherein said first candidate node group is said first group;
wherein said second candidate node group is generated by selecting at least one unselected node of said first group and a node paired with said first node; and
wherein said third candidate node group is generated by selecting (1) at least one unselected node of said first group, a node paired with said first node, and a node paired with said second node when said second node is selected from said first group, or (2) at least one unselected node of said first group when said second node is selected from said second group.

4. The method of claim 1:
wherein said first candidate node group is generated by:
assigning a weight $w_0$ to each node in said first group and $w_0+1$ to each node in said second group; and
selecting at least one node whose weight is $w_0$.

5. The method of claim 4:
wherein said second candidate node group is generated by:
updating said weight of each node in said first group to $w_0+1$ except for said first node, and said weight of each node in said second group to $w_0+2$ except for a node paired with said first node; and
selecting at least one node whose weight is $w_0+1$.

6. The method of claim 5:
wherein said third candidate node group is generated by:
when said second node is selected from said second group, selecting at least one node whose weight is $w_0+1$; and
when said second node is selected from said first group, updating said weight of each node in said first group to $w_0+2$ except for said first node and said second node, said weight of at least one node in said second group to $w_0+3$ except for two nodes paired with said first node and said second node, wherein weights of said two nodes are updated to $w_0+2$, and selecting at least one node whose weight is $w_0+2$.

7. The method of claim 1 comprising:

recreating said driving route when at least one node is inserted to said first group and said second group.

8. The method of claim 1 comprising:

creating a preliminary route for each of said at least one cluster by determining an entrance node and an exit node for each of said at least one cluster; and said driving route is generated by using said preliminary route for each of said at least one cluster.

9. A system for generating a driving route for a vehicle providing a mobility service comprising:

a navigation device configured to determine a current location of said vehicle using a Global Positioning System (GPS) through a first application installed on said navigation device of said vehicle, a mobile device configured to transmit geolocation data through a second application installed on a mobile device of at least one user, and a route creation device comprising a processor and memory including computer program commands, said memory and program commands configured to, with said processor, enable said route creation device to at least:

receive geolocation data associated with a plurality of nodes in a first group and a plurality of nodes in a second group from said mobile device and said current location from said navigation device over a data communication network, wherein each node in said first group forms a pair with each node in said second group;

create at least one cluster using a clustering algorithm based on a plurality of middle points based on said plurality of nodes in said first group and said plurality of nodes in said second group;

determine a visiting sequence of said at least one cluster based on said current location of said vehicle and a centroid of each of said at least one cluster;

select a first node from a first candidate node group included in a cluster determined to be visited first among said at least one cluster based on said current location of said vehicle;

select a second node from a second candidate node group based on a location of said first node;

select a third node from a third candidate node group based on said location of said first node and a location of said second node; and generate a driving route in an order of said first node, said second node, and said third node, and restrict a movement of said vehicle based on said generated driving route to enforce a pickup and drop-off order constraint, wherein a plurality of nodes in said first candidate node group are included in said cluster determined to be visited first, transmit said driving route comprising travel time information over said data communication network to said navigation device, causing said first application to display said driving route on said navigation device, wherein a travel time to said first node is determined from said current location, and travel times among said first, second, and third nodes are determined based on road quality information in a database of said route creation device, wherein said route creation device is further configured to determine the visiting sequence by;

determining, based on said current location of said vehicle, an entrar >of a cluster determined to be visited first and an exit node of a cluster determined to be visited last among said at least one cluster;

calculating distances for all combinations between at least one node of said second group included in a previously visited cluster among said at least one cluster and at least one node of said first group included in a next cluster to be visited among said at least one cluster, and determining, among said all combinations, a node of said first group of said previously visited cluster included in a combination having a shortest distance as the exit node of said previously visited cluster, and determining a node of said second group of said next cluster to be visited in said combination having a shortest distance as the entrance node of said next cluster to be visited.

10. The system of claim 9:

wherein said first candidate node group is said first group;

wherein said second candidate node group is generated by selecting at least one unselected node of said first group; and wherein said third candidate node group is generated by selecting a node paired with said first node and a node paired with said second node.

11. The system of claim 9:

wherein said first candidate node group is said first group;

wherein said second candidate node group is generated by selecting at least one unselected node of said first group and a node paired with said first node; and wherein said third candidate node group is generated by selecting (1) at least one unselected node of said first group, a node paired with said first node, and a node paired with said second node when said second node is selected from said first group, or (2) at least one unselected node of said first group when said second node is selected from said second group.

12. The system of claim 9:

wherein said first candidate node group is generated by:

assigning a weight wo to each node in said first group and $w_0+1$ to each node in said second group; and selecting at least one node whose weight is $w_0$.

13. The system of claim 12:

wherein said second candidate node group is generated by:

updating said weight of each node in said first group to $w_0+1$ except for said first node, and said weight of each node in said second group to $w_0+2$ except for a node paired with said first node; and selecting at least one node whose weight is $w_0+1$.

14. The system of claim 13:

wherein said third candidate node group is generated by:

when said second node is selected from said second group, selecting at least one node whose weight is $w_0+1$ ; and when said second node is selected from said first group, updating said weight of each node in said first group to $w_0+2$ except for said first node and said second node, said weight of at least one node in said second group to $w_0+3$ except for two nodes paired with said first node and said second node, wherein weights of said two nodes are updated to $w_0+2$, and selecting at least one node whose weight is $w_0+2$.

15. The system of claim 9 comprising:

recreating said driving route when at least one node is inserted to said first group and said second group.

16. The system of claim 9, comprising:

wherein said route creation device is configured to generate said driving route using a preliminary route for each of said at least one cluster.

* * * * *